United States Patent [19]
Burgdorf et al.

[11] Patent Number: 5,188,439
[45] Date of Patent: Feb. 23, 1993

[54] BRAKE PRESSURE CONTROL

[75] Inventors: Jochen Burgdorf, Offenbach-Rumpenheim; Helmut Steffes, Hattersheim; Peter Volz, Darmstadt; Erhard Beck, Weilburg; Dalibor Zaviska, Frankfurt am Main, all of Fed. Rep. of Germany

[73] Assignee: Alfred Teves GmbH, Frankfurt Am Main, Fed. Rep. of Germany

[21] Appl. No.: 705,677

[22] Filed: May 24, 1991

[30] Foreign Application Priority Data

May 25, 1990 [DE] Fed. Rep. of Germany ....... 4016746

[51] Int. Cl.$^5$ ............................ B60T 8/40; B60T 8/42
[52] U.S. Cl. ................................ 303/116.1; 303/115.1
[58] Field of Search ......... 303/113 R, 115 R, 115 PP, 303/116 R, 116 PC, 117

[56] References Cited

U.S. PATENT DOCUMENTS

| 4,964,680 | 10/1990 | Nokubo et al. | 303/117 |
| 5,058,961 | 10/1991 | Mergenthaler | 303/116 R |

FOREIGN PATENT DOCUMENTS

| 0353635 | 7/1989 | European Pat. Off. |
| 0361336 | 9/1989 | European Pat. Off. |
| 0363845 | 10/1989 | European Pat. Off. |
| 3142137 | 6/1982 | Fed. Rep. of Germany |
| 3728953 | 3/1989 | Fed. Rep. of Germany |
| 3809099 | 9/1989 | Fed. Rep. of Germany |
| 3827367 | 2/1990 | Fed. Rep. of Germany |
| 3838571 | 5/1990 | Fed. Rep. of Germany |
| 0077267 | 4/1987 | Japan ............... 303/116 R |

Primary Examiner—Robert J. Oberleitner
Assistant Examiner—Chris Schwartz
Attorney, Agent, or Firm—J. Gordon Lewis; Robert P. Seitter

[57] ABSTRACT

A brake pressure control for use with an automotive anti-locking control system (ABS) and/or a traction slip control system (ARS) is provided. The control comprises a pressure modulator for varying the hydraulic pressure in the wheel cylinder (13) during the brake pressure control mode, with the pressure modulator exhibiting at least one inlet valve and at least one outlet valve (21) associated with the wheel cylinder (13), at least one motor-driven pump (6) for generating a hydraulic pressure, and an electronic controller. The inlet valve is pressure actuated and comprises a piston-cylinder assembly including a piston (7) forcing, upon application of the brake pressure, a filling volume (14) into the wheel cylinder (13), followed by a throttled rise in pressure caused by a throttling flow restriction (16) defined through the piston.

23 Claims, 6 Drawing Sheets

BRAKE PRESSURE CONTROL

BACKGROUND OF THE INVENTION

The present invention is concerned with a brake pressure control, in particular for use with automotive vehicles, comprising an anti-locking control system (ABS) and/or a traction slip control system (ASR), which operates on a fluidic, especially hydraulic, pressure medium, the invention comprising a master cylinder, one or more wheel cylinders, a pressure modulator for changing the hydraulic pressure in the wheel cylinders during the brake pressure control mode, with the pressure modulator exhibiting at least one inlet valve and at least one outlet valve associated to a wheel cylinder, at lease one pressure fluid source, preferably a motor-driven pump, for generating a fluidic, especially hydraulic pressure, and an electronic controller.

Generically, the invention is based on brake systems of the type as described, for example, in German unexamined published application No. 3731603.

Brake systems of the afore-mentioned type are equipped with an anti-locking control system and/or a traction slip control system. They exhibit one or more auxiliary pumps. Such pumps deliver, during the antilocking control mode, pressure fluid in a pressure modulator.

The pressure modulator has a number of hydraulic valves, in particular, inlet and outlet valves that are associated with predetermined wheel cylinders.

The driver phase of the electronic controller controls the inlet and outlet valves in accordance with the control algorithm installed in the controller. With the outlet valve opened and the inlet valve closed, a pressure decrease phase is generated in the wheel cylinder. With the inlet valve closed and the outlet valve closed, a phase of constant pressure will be established. With the inlet valve opened and the outlet valve closed, a phase of pressure re-increase will be attained.

Moreover, a hydraulic circuit has been described wherein the inlet valve causes a throttling effect, see German Patent Application P 3919842.1.

The afore-mentioned Patent Application describes an anti-locking, hydraulic brake system for use with automotive vehicles, comprising a master cylinder, a pressure fluid collector, at least one wheel brake which, through a brake conduit, is in communication with the master brake cylinder and, through a return conduit, is in communication with the pressure fluid collector. An electromagnetically actuated outlet valve is also provided in the return conduit to block, in the resting position thereof, the return conduit and to open, in the switching position thereof, the return conduit. A throttle valve is provided in the brake conduit and has two switching positions, with an unthrottled connection to the wheel in a first switching position and a throttled connection existing in the second switching position. A pump takes in pressure fluid from the pressure fluid collector and delivers same through a pressure conduit, to the master cylinder. A sensor detects the angular velocity of the wheel to be decelerated, and an electronic analyzer analyzes the sensor signal and generates switching signals for the pump drive and the outlet valve.

According to the afore-mentioned German Patent Application it is suggested that by means of a control conduit the throttle valve is connected to the pump outlet so that the pressure on the pump outlet causes the throttle valve to switch from the first into the second switching position. During the control mode, according to the lattermentioned German Patent Application, a throttle provided in the inlet conduit leading to the wheel cylinder will become operative. During the control mode, pressure fluid is delivered by the pumps, through the throttle, into the wheel cylinder, thereby causing a pressure reincrease in the wheel cylinder.

The pressure decrease is attained through opening of an outlet valve The outlet valves are electromagnetically actuable valves closed in deenergized condition (SG-valves) Conventionally, such SG-valves are actuated by an output signal of the electronic controller of the anti-locking system.

The afore-mentioned German Patent Application, is deemed to constitute the prior state of art.

The following problems are sought to be solved by the present invention:

The state-of-the-art anti-locking systems equipped with electromagnetically actuated valves open in deenergized condition, so called SO-valves, forming the inlet valves, are intended to be replaced by simpler and less costly valves. The invention is to enable the inlet valves to be hydraulically actuated.

Another object of the invention resides in that, during normal deceleration, high pressure increase gradients be attained while maintaining a good pedal feeling. In the anti-locking control mode, high pressure decrease gradients are intended to be achieved in the pressure decrease phase.

The invention is desired to be suitably used with both closed and open systems Closed systems are those having no pressure fluid reservoir open to the atmosphere in their circuits while open systems do contain such pressure fluid reservoirs.

The invention is intended for use with all types of brake pressure control systems.

SUMMARY OF THE INVENTION

The problems encountered, in the practice of the invention, are solved in that the inlet valve is configured as a piston-cylinder-type assembly, the axially displaceable piston of which separates a first chamber in communication with the master cylinder and the pump pressure side (master cylinder-pump pressure chamber) and a second chamber in communication with the wheel cylinder (wheel cylinder pressure chamber). Advance of the piston against the resistance of a spring forces pressure fluid from the wheel cylinder pressure chamber into the wheel cylinder , and a throttle passage in the piston , through its flow cross-section, connects the master cylinder-pump pressure chamber to the wheel cylinder pressure chamber.

A compact design is achieved in that the piston is substantially in the form of a sleeve having a sleeve bottom receiving the end of the spring in abutment with the piston, and that the sleeve bottom contains a throttle.

To attain a safe pressure relief in the wheel cylinder upon withdrawal of the brake pedal , there is provided between the wheel cylinder pressure chamber and the wheel cylinder, on the one hand, and the conduit between the master cylinder and the master cylinder-pump pressure chamber, on the other hand, a conduit including a check valve opening toward the master cylinder.

According to another embodiment the inlet valve functions as a flow-limiting valve in which the axially displaceable piston cooperates with an aperture which is progressively covered to reduce flow as the piston is advanced by increasing pressure in the master cylinder pump pressure chamber.

The piston as noted, has a throttling passage, which, through the flow cross-section thereof, connects the master cylinder-pump pressure chamber to the wheel cylinder pressure chamber, and defines the only flow path to the wheel cylinder from the master cylinder and pump.

The piston is configured as a control slide containing a control edge, and the spring is in the form of a control spring. The piston under the effect of the pressure in the master cylinder pump pressure chamber acting thereon, on the one hand, and under the effect of the spring acting thereon, on the other hand, in the opposite direction, and of the pressure in the wheel pressure chamber, takes a position of equilibrium, wherein the control edge has swept over the aperture of the conduit leading to the wheel cylinder to such an extent that a constant nominal flow is maintained in the conduit leading to the wheel cylinder, which is independent of any further pressure increase in the master cylinder-pump pressure chamber.

In order to immediately attain, upon commencement of the deceleration process, a flow-limiting effect according to another embodiment of the invention, the metering aperture of the outlet conduit leading to the wheel cylinder is located just ahead of the control edge of the piston when in its resting or retracted position. Hence, according to that form of embodiment, no initially filling volume is forced into the wheel cylinder, as metering of the flow begins immediately.

To insure that, in the pressure decrease phase of the anti-locking control mode, the filling volume be retained in the wheel cylinder pressure chamber, it is provided according to another embodiment, that disposed in the conduit between the wheel cylinder pressure chamber, on the one hand, and upstream from the point of connection between the wheel cylinder and the outlet valve, on the other hand, is an additional throttling element.

By the invention, the conventionally used electromagnetically actuated valves and complex flow supply therefor, and the required driver phases installed in the electronic controller of the anti-locking system are eliminated, replaced by simple, hydraulically actuated valves. In normal deceleration, high pressure increase gradients will be obtained while maintaining a good pedal feeling.

Further details of the invention, of the problems encountered and the advantages attained will become manifest from the following description of embodiments of the invention.

DETAILED DESCRIPTION

In the following description of the embodiments of the invention, a knowledge of the prior state of art as in the afore-mentioned literature references is assumed.

The description and drawings of these references may be relied upon for describing the starting basis for the subsequently explained forms of embodiment of the invention.

During changing of the wheel cylinder, for example of a wheel cylinder of a rear axle, the flow volume necessary to build to a pressure rise up to about 50 bar, is taken into the wheel cylinder. This initial or "filling" volume of flow prior to brake actuation, mainly accounts, among other things, for a direct pedal feeling. Beyond the initial volume of flow necessary to build up to actuation pressures, only very little additional volume is taken up by the wheel cylinder during actual brake operation.

These processes are taken into account in the embodiments to be described hereinafter, in that a piston in the inlet valve is advanced by the master cylinder pressure and/or pump pressure, forcing the initial or filling volume in an unthrottled flow into the wheel cylinder when the brake is first actuated to increase wheel cylinder pressure. The pedal feeling is not affected thereby.

Thereafter, the piston strikes a stop; further flow occurring during pressure increases beyond 50 bar is now effected in throttled manner. The pressure between the two chambers thereafter substantially equalizes so that the spring returns the piston to its initial resting position.

Figure 3:
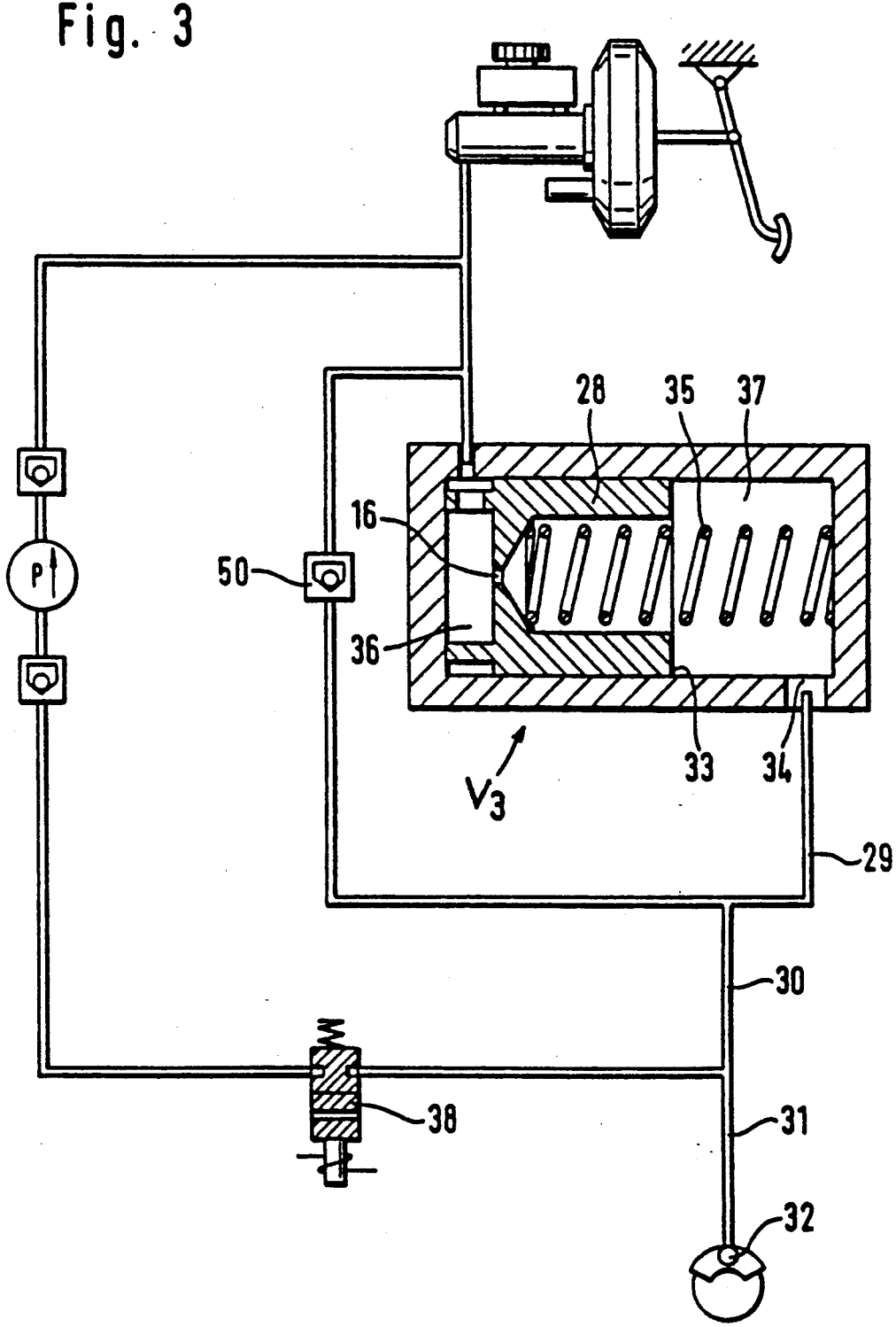
FIG. 3 is a diagram of a brake control system showing in enlarged section a second embodiment of an inlet valve according to the present invention.

When reswitching to the anti-locking control, the SG-valve of the disclosed embodiments is opened by a signal from the electronic control circuit 60, and the wheel cylinder volume and the filling volume are discharged, thereby causing the piston, in the disclosed embodiments, to again be immediately advanced to its right-hand-sided stop position, causing the pressure to again commence to be increased in the wheel cylinder, this function constituting a "pressure reincrease phase" of control, with pressurized fluid either flowing through a fixed orifice (FIG. 1) or through a flowlimiting valve assembly (FIG. 3).

The fixed orifice must be of a design such that at a defined maximum pressure, the pump volume exceeds or is equal to the flow capacity of the orifice. The same applies, with the necessary changes, when using a flowlimiting metering valve assembly, see curves 27 and 46 of the diagrams of FIGS. 2 and 4, respectively.

In disc brakes with rigid calipers, and in drum-type brakes that can be even more rigid, for both the normal brake mode and for the anti-locking control mode, a flow-limited pressure build-up during the entire brake actuation stroke, without the unthrottled filling flow is suggested.

Figure 1:
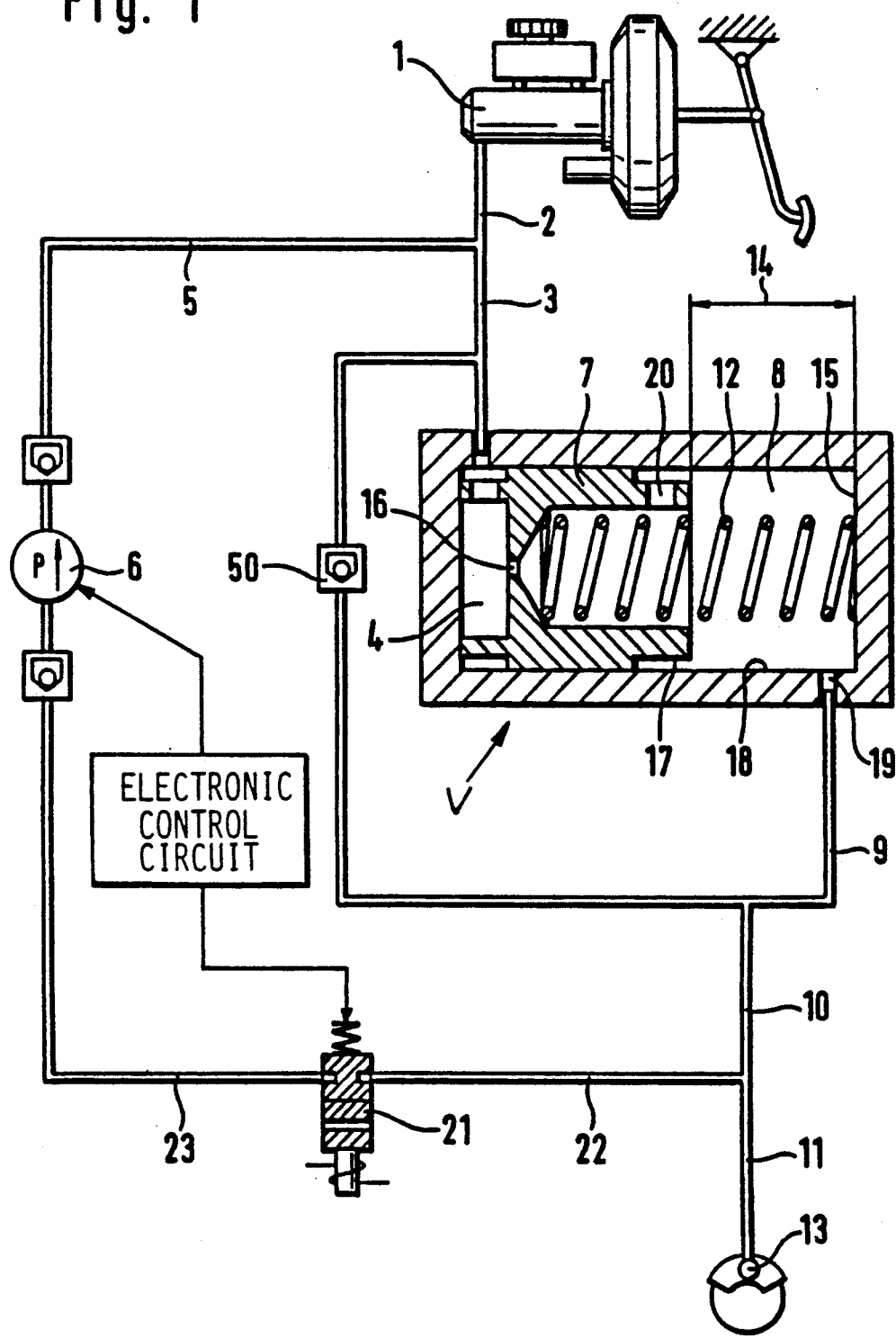
FIG. 1 is a diagram of a brake control system shown with an inlet valve enlarged and in section.

Design and way of operation each embodiment will now be described:

An automatic hydraulic brake pressure control system is depicted diagrammatically in FIG. 1 including a pedal actuated master cylinder 1 generating an application fluid pressure for one or more brake operating wheel cylinders 12. This system is of the type including an automatic control over the application of pressure to the wheel cylinder, as in an antiskid (ABS) or traction slip control (ASR) system.

For such systems, pump 6 controlled by the electronic control circuit 60 also generates an application pressure, which is transmitted via an inlet valve V constituting an inlet pressure control device.

Inlet valve V houses a movable element comprising a piston 7 slidably mounted in a bore 18 in the valve V. A first chamber 4 is defined by the valve V and the left side of the piston 7 and a second chamber 8 on the right side of the piston 7.

Flow is enabled through the inlet valve V from the master cylinder 1 and pump 6 by passage means comprised of an orifice throttler 16 found through the piston 7 in communication with the first chamber 4 as well as the second chamber 8, and an outlet aperture 19 in second chamber 8.

In the normal brake mode, the master cylinder 1 of FIG. 1, through conduits 2,3, delivers fluid under pressure to chamber 4. In addition, chamber 4, through conduits 5,3, is in communication with the pressure side of pump 6. In the anti-locking control mode, the pump 6 delivers pressure fluid to chamber 4. Chamber 4, is, therefore, continued to be designated as the master cylinder-pump pressure chamber.

Chamber 8, disposed to the right of the sleeve-type piston 7, through conduits 9, 10, 11, is in communication with the wheel cylinder, for which reason it is designated as the wheel cylinder pressure chamber. Reference numeral 19 refers to the outlet aperture of conduit 9.

In the normal brake mode and in the anti-locking control mode, through the pressure fluid delivered into the master cylinder-pump pressure chamber, the piston 7 is moved to the right against the force of bias means comprised of a spring 12, showing that a major amount of pressurized fluid i.e., the filling volume, is delivered by rightward movement of the piston 7, in the initial phase of deceleration This filing volume, in FIG. 1, corresponds to the distance 14 traveled by the piston 7.

Figure 6:
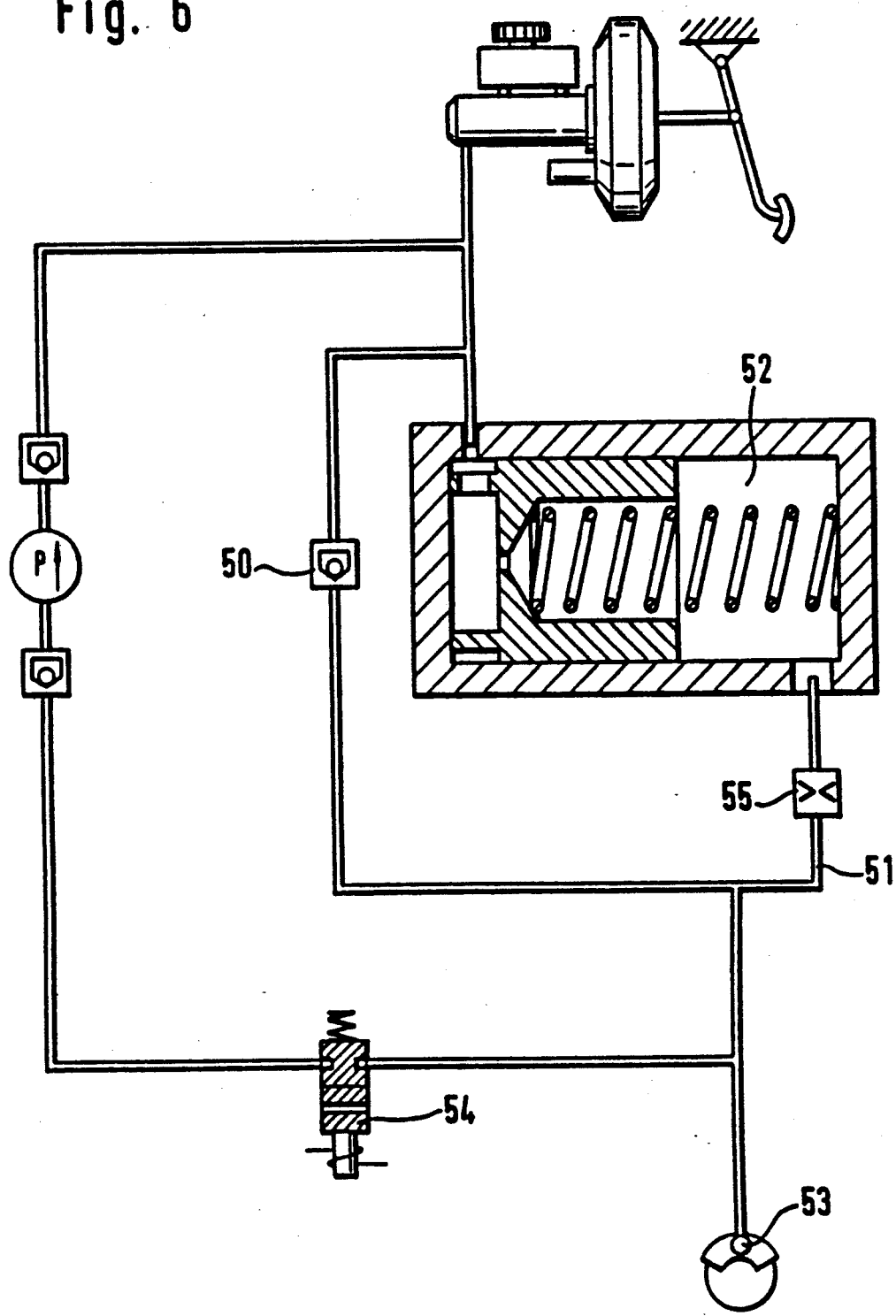
FIG. 6 is a diagram of a brake control system showing in section the inlet valve of FIG. 3 with an additional system control component shown diagrammatically.

The filling volume, also in the examples of embodiment according to FIGS. 3 and 6, upon commencement of the deceleration, is forced into the wheel cylinder. Hence, the wheel cylinder is quickly filled with pressurized fluid. The requirement of an initially high volume flow into the wheel cylinder at low pressures is thus taken care of.

The piston 7, is subsequently moved against a fixed stop comprised of the end wall 15. The flow to the wheel cylinder thereafter rises with pressure difference increases as shown in curve 26 of the diagram according to FIG. 2, the restrictive effect of orifice throttle 16 becoming operative after the piston 7 has moved against the stop.

In the pressure decrease phase of the control mode, electromagnetically actuable outlet valve 21, closed in de-energized condition (SG-valve), is opened through output signals of the electronic control circuit 60 of the anti-locking system by pulsation, thereby enabling pressure fluid to be passed from the wheel cylinder, through conduits 11, 22, 23, to the intake side of the pump. In open systems, the pressure fluid is delivered to a pressure fluid reservoir open toward the atmosphere.

During normal deceleration, in the pressure reincrease phase of the control mode, the piston 7 is in its right hand-sided advanced position. Pressure fluid is passed from the pump 6 and the master cylinder 1 into the master cylinder-pump pressure chamber 4, whence it flows through the throttle 16, the passageway 20 formed as a transverse bore between piston step 17 and cylindrical wall 18, to the wheel cylinder to maintain a flow passage even with the piston 7 against endwall 15.

Figure 2:
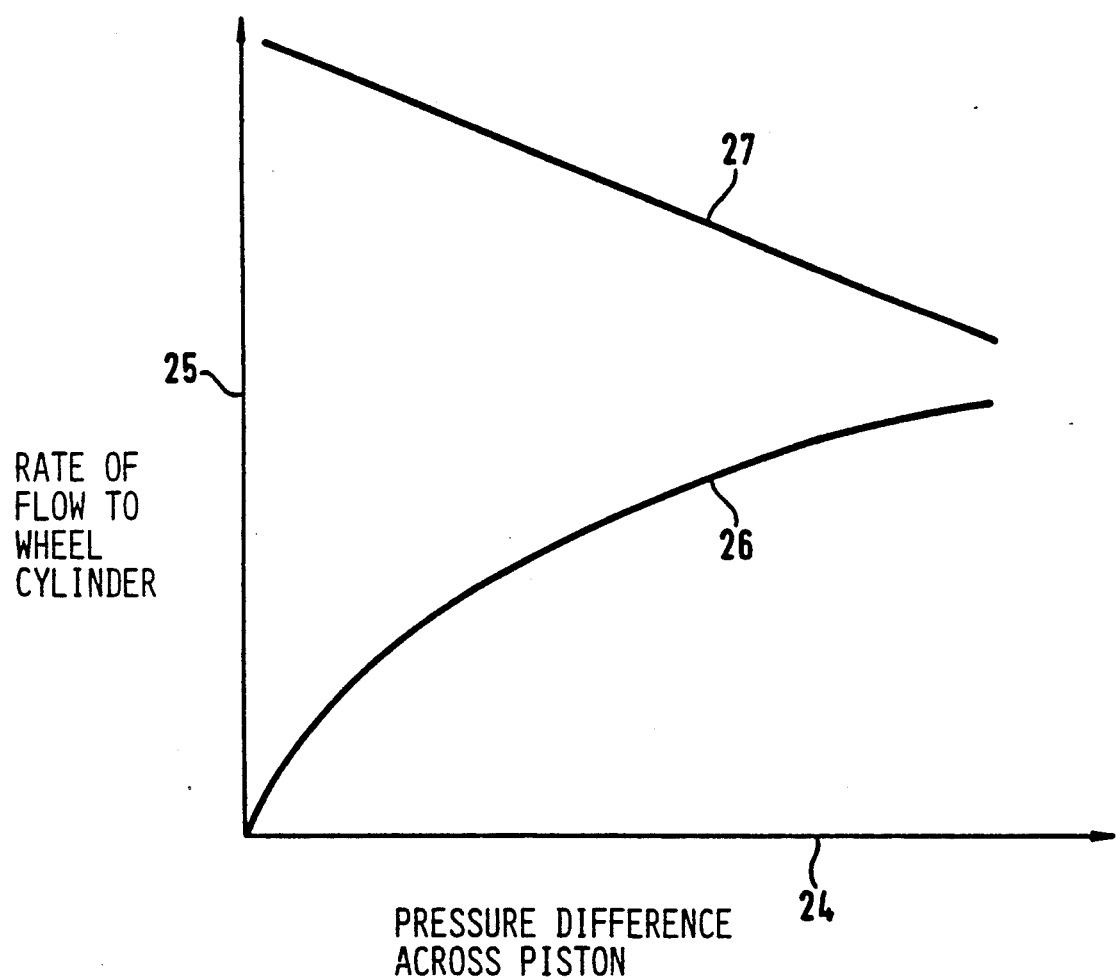
FIG. 2 is a plot of wheel cylinder flow versus pressure for the embodiment according to FIG. 1.

FIG. 2 is a plot showing the curve of the volume throughput per unit of time. The abscissa 24 carries the values of the difference in pressure between the master cylinder-pump pressure chamber and the wheel cylinder pressure chamber. Entered on the ordinate 25 are the values of the volume of flow to the wheel cylinder per unit of time, i.e., the rate of flow when the master cylinder-pump pressure chamber is pressurized. Curve 26 describes, as shown, the relationship between increases in the flow rate of pressure fluid into the wheel cylinder with increases in pressure differences. This relationship holds after the filling volume has been delivered to the wheel cylinder.

The curve 26 also describes the delivery of pressure fluid during a pressure reincrease phase after the wheel cylinder pressure has been discharged by opening of the outlet valve 21. The curve 27 represents the flow delivered by the pump.

According to the embodiment of FIG. 3, the operation of the inlet valve V3 is of a metering or flowlimiting valve assembly rather than that of a fixed orifice as the embodiment of FIG. 1. Also, in that embodiment, first the filling volume is forced by advance of the piston 28 via conduits 29, 30, 31, into the wheel cylinder 32, thereby supplying the large volume of filling flow into the wheel cylinder at low pressures.

Figure 5:
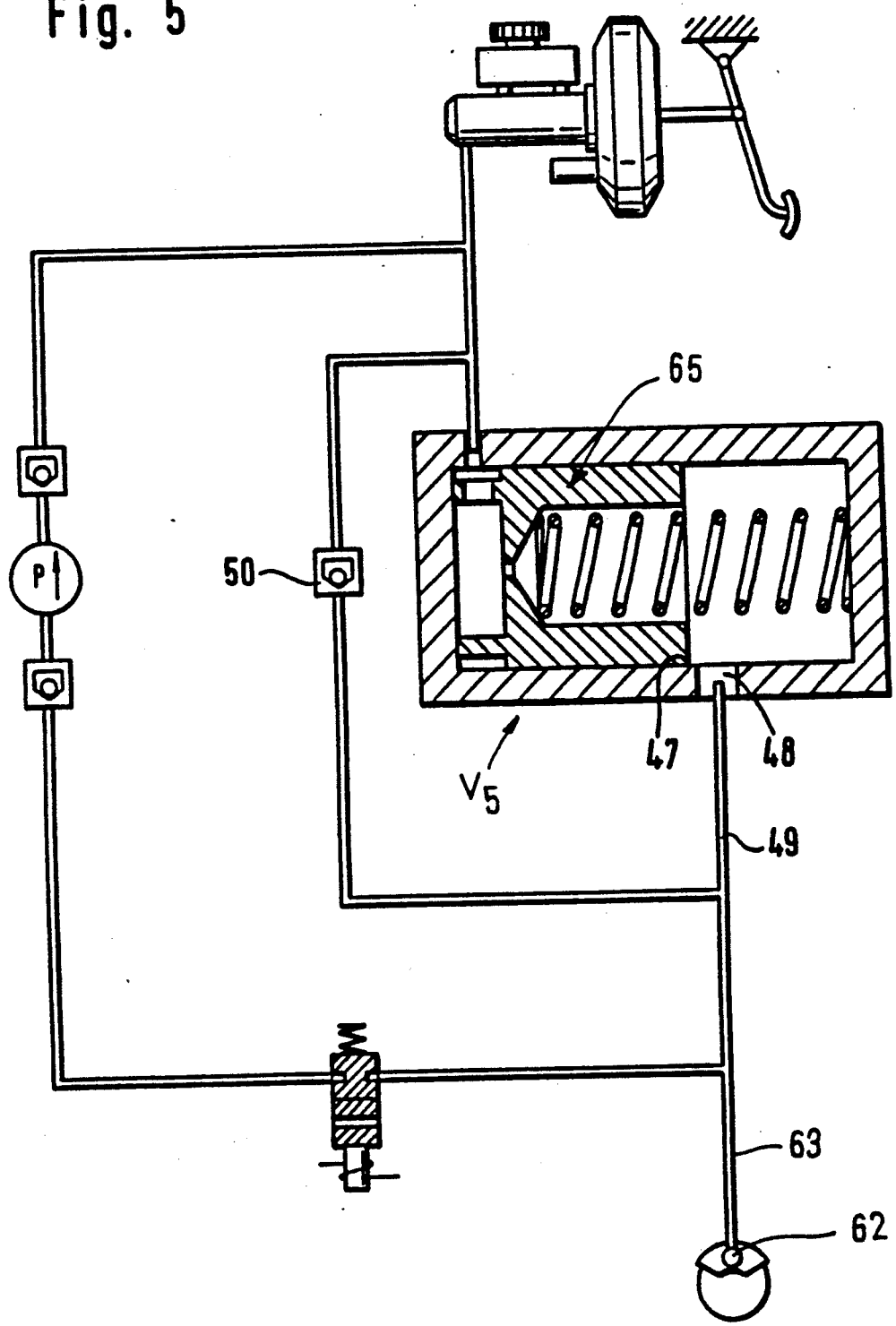
FIG. 5 is a diagram of a brake control system showing in enlarged section a third embodiment of an inlet valve according to the present invention.

The control edge 33 of the piston 28, acting as a control slide, then moves into the area of the metering aperture 34 of the conduit leading to the wheel cylinder 13. For easier understanding, the metering aperture is shown in FIGS. 3, 5 and 6 in an enlarged exaggerated scale.

Upon the piston 28 reaching that point of advance, the flow-limiting function of the flow-limiting valve assembly will commence.

The essential functional components of a flowlimiting valve assembly are as follows: a movable element having a flow passage formed therein allowing flow past the element, means for applying a control force to the movable element and a metering outlet aperture past which the movable element sweeps that can be opened through the control force and closed through the pressure difference ahead of and behind the movable element.

Specifically, in the embodiment according to FIG. 3, the piston 28 constitutes the previously mentioned control edge 33 moving past metering outlet comprised of aperture 34 and the control force is applied by a control spring 35.

The following steps are taken during the flowlimiting control process:

The pressure in the master cylinder-pump pressure chamber 36 acts on the piston 28 to urge movement from the left to the right. The piston 28 is displaced to the right. A pressure is built up in the wheel cylinder pressure chamber 37 which, together with the force of the control spring 35, acts from the right to the left on the piston 28, the piston 28 then reaching a position in which equilibrium of these forces occurs. In that position, through the control edge 33, in the area of the aperture 34, a flow cross-section is adjusted which results in a constant nominal flow to the wheel cylinder 32. This nominal flow is independent of a pressure increase in the master cylinder-pump pressure chamber 36 since the flow cross section is reduced to offset the increase in pressure.

Such a flow-limiting control will always occur, as shown, once the control edge 33 reaches the area of the aperture 34. This occurs during the phase of pressure reincrease after a wheel cylinder pressure decrease in the control mode. Also, this may occur once a deceleration takes place in the normal brake mode on uneven roads.

For, during deceleration on uneven roads, in the normal brake mode, the piston 28 very quickly may get into a position advanced to the right. The control edge 33 will then commence, as shown, its controlling function also in the normal brake mode.

In deceleration on icy roads, the anti-locking control mode will occur very early, meaning that the pressure in the wheel cylinder, through opening of the outlet valve, is very quickly decreased, in a pulsed fashion.

The wheel cylinder pressure chamber 37 thus is immediately emptied, and the control edge 33 rapidly reaches the area of the aperture 34, thereby commencing an early flow limitation.

The remaining components of the example of embodiment according to FIG. 3 have been described with reference to FIG. 1.

Figure 4:
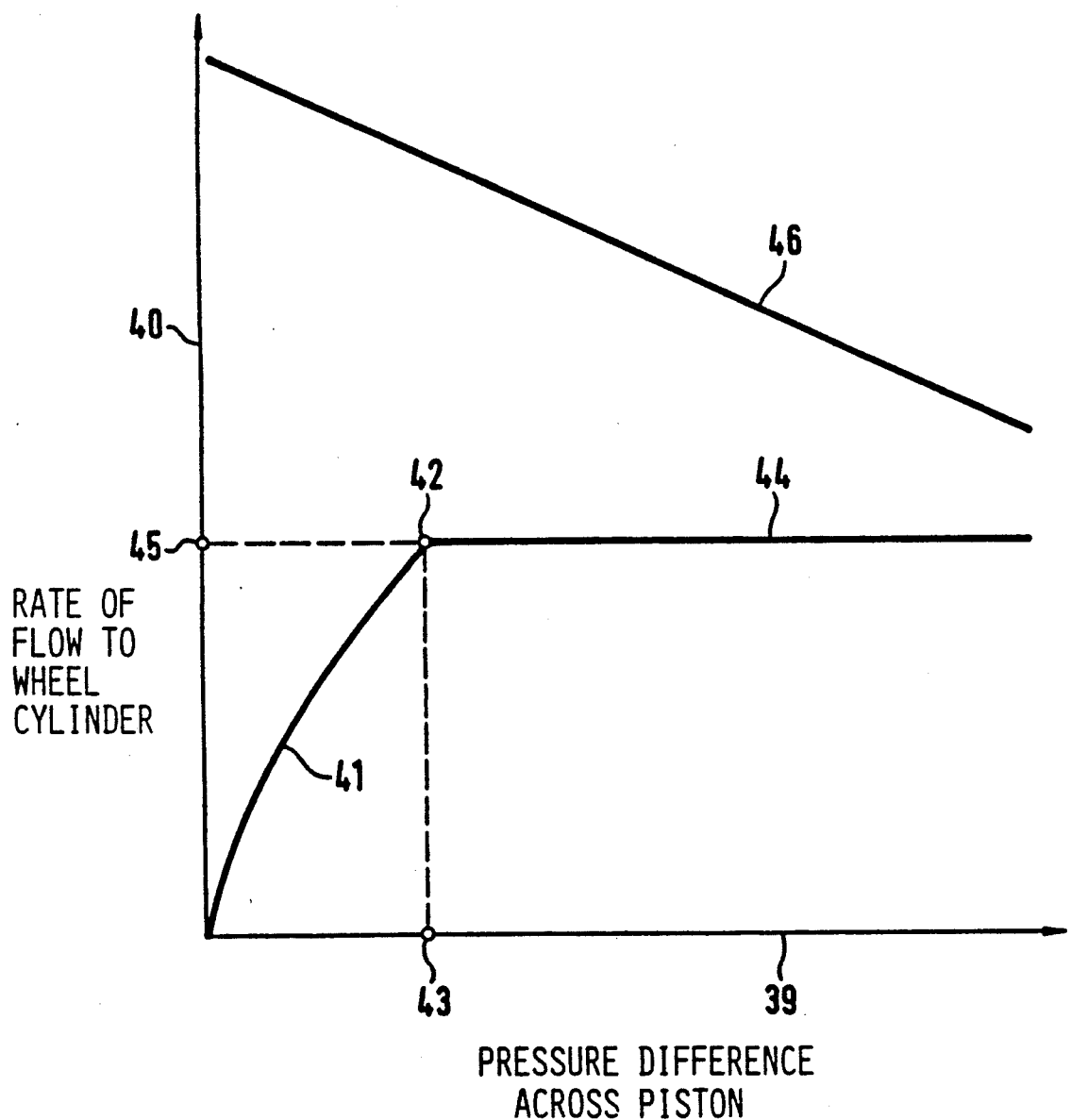
FIG. 4 is a plot of wheel cylinder flow versus pressure for the embodiment according to FIG. 3.

FIG. 4 is a plot showing the function of the flowlimiting valve assembly. Entered on the abscissa 39 are the values for the pressure differences and, on the ordinate 40, the values for the volume flow to the wheel cylinder per unit of time, i.e., the flow rate.

The curve section 41 shows the rise in the rate of flow until the switch-over point 42 is reached. The switch-over point 42 is at a defined pressure difference the value of which is designated by numeral 43. The switch-over point is that point after which increases in pressure differences do not result in increases in the flow rate, that is only a constant nominal flow rate is delivered to the wheel cylinder notwithstanding changes in the pressure difference.

This constant nominal flow rate is illustrated by the straight line 44. The magnitude of the constant nominal flow rate is indicated on the ordinate by 45. The curve 46 represents the flow rate delivered by the pump.

No expelling of an initial filling volume is provided in the embodiment of the inlet valve V5 according to FIG. 5. The control edge 47, in FIG. 5, is already located on the aperture 48 of the conduit 49 leading to the wheel cylinder 62 via conduit 63, when the piston 65 is in its fully retracted, resting position thereby insuring, especially in the normal mode, an immediate flow limitation for the wheel cylinder 62. This is advantageous to disc brakes having rigid calipers, and rigid drum-type brakes. In rigid calipers, a flow-controlled pressure increase, in normal deceleration and in the anti-locking control, does not involve any disadvantages.

The remaining components of the example of embodiment according to FIG. 5 have been described with reference to FIG. 1.

In the embodiments shown in FIGS. 1, 3, and 5 a check valve 50 is provided which is disposed in a bypass conduit interconnecting the wheel cylinder-pressure chamber and the wheel cylinder, on the one hand, and the conduit between the master cylinder and the master cylinder-pump pressure chamber, on the other hand. The check valve 50 is able to open toward the master cylinder.

In the event of a pressure decrease in the master cylinder (withdrawal of the brake pedal), pressure fluid, through the check valve 50, flows from the wheel cylinder and the wheel cylinder pressure chamber back into the master cylinder bypassing the inlet valve V (and outlet valve 21).

FIG. 6 shows the subject matter of FIG. 3 supplemented by the following features: Provided in the conduit 51 downstream from the wheel cylinder pressure chamber 52 to the wheel cylinder 53 and upstream from the point of connection to the SG-valve 54, is an additional throttling element 55.

This additional throttling element also may be employed with the subject matter of FIG. 1.

Also, it is possible to employ an element other than a throttle or orifice to insure a flow resistance. The use of a orifice is advisable once the greatest possible viscosity independence is desired to be achieved.

The additional throttle element 55 performs the following function: In the examples of embodiments so far described, a single filling volume is forced through the piston into the wheel cylinder upon commencement of the deceleration process.

At the beginning of an anti-locking control, i.e., in the phase of pressure decrease, forcing the filling volume in the wheel cylinder pressure chamber out to the wheel cylinder can result in a delayed or slowed-down pressure decrease in the wheel cylinder.

This disadvantage is remedied or overcome by the throttle element 55. The throttle element precludes, upon commencement of the control mode, i.e. upon a pressure decrease, a rapid evacuation of the wheel cylinder pressure chamber 52.

Conversely, upon a switch-over, in the normal brake mode or in the anti-locking control mode, to a orifice, see FIG. 1, or to a flow-limiting control, see FIG. 3, the resultant flow is left almost unaffected. The desired pressure increase gradients, during the antilocking control mode and during the normal deceleration process, will be maintained.

Owing to the fact that the throttling element 55 retains the filling volume in the wheel cylinder pressure chamber 52, the pulsating SG-valve 54, advantageously, in the phase of pressure decrease, in the anti-locking control mode, already with the first impulse may cause a heavy pressure decrease in the wheel cylinder 53.

The remaining components of the example of embodiment according to FIG. 6 have been described with reference to FIGS. 1 and 3.

We claim:
1. A brake pressure control for automotive vehicles having a hydraulic brake system including at least one wheel cylinder, a master cylinder having hydraulic fluid therein and a brake pedal for causing pressurizing of said hydraulic fluid in said master cylinder;
an automatic control system for said brake system including electronic control circuit means and pressure modulator means for automatically varying the pressure at said at least one wheel cylinder, said pressure modulator means responsive to said electronic control circuit means;
said pressure modulator means including an electrically driven pump automatically actuated by said electronic control circuit means, said pump having an outlet connected to said brake system to pressurize said one or more wheel cylinders;

said pressure modulator means also including an electrically controlled outlet valve connected with said at least one wheel cylinder to relieve pressure therein when said outlet valve is opened, said outlet valve responsive to said electronic control circuit means; and, an inlet pressure control device including a housing an an element mounted in said housing and together with said housing defining first and second chambers, said first chamber in fluid communication with said master cylinder and said pump outlet, and means placing said second chamber in communication with said at least one wheel cylinder, said element movable form a retracted resting position to an advanced position in said housing in response to fluid pressure exerted in said first chamber, spring bias means acting on said element to urge said element towards said retracted resting position and to resist sad movement to said advanced position, and fluid passage means defined in said element allowing restricted fluid flow from said first chamber to said second chamber past said element, said fluid passage means defining the sole flow path from said master cylinder-pump pressure chamber to said at least one wheel cylinder, so that pressurizing of said at least one wheel cylinder by said master cylinder and said pump is carried out only via said inlet pressure control device.

2. The brake pressure control according to claim 1 wherein said movable element comprises a piston slidably mounted in a bore in said housing, said first and second chambers defined on either side of said piston, and said spring bias means comprises a spring acting on one end of said piston.

3. The brake pressure control according to claim 2 wherein said fluid passage means comprises an orifice in said piston establishing fluid communication between said first and second chambers.

4. The brake pressure control according to claim 1 wherein said element is movable against a fixed stop located at said advanced position in said housing after a predetermined extent of travel to expel a predetermined volume of fluid contained in said second chamber with said element in said retracted resting position to said at least one wheel cylinder, whereby said fluid passage means allows only throttled flow to said one or more wheel cylinders after said predetermined travel of said element.

5. The brake pressure control according to claim 1 wherein said means placing said second chamber in communication with said at least one wheel cylinder includes a metering outlet opening in said housing entering into said second chamber and communicating with said at least one wheel cylinder, said element moving past said outlet opening during said travel in said housing to said advanced position to variably restrict said opening so as to limit flow with increasing pressure in said first chamber, whereby resulting in a constant flow rate to said one or more wheel cylinders despite increasing pressure in said first chamber.

6. The brake pressure control according to claim 5 wherein said metering outlet opening is located to be restricted upon initial movement of said element from said retracted resting position.

7. The brake pressure control according to claim 5 wherein said metering outlet opening is restricted only after a predetermined extent of travel of said element.

8. The brake pressure control according to claim 1 further including a bypass conduit directly connecting said at least one wheel cylinder to said master cylinder bypassing said inlet pressure control device and said outlet valve, and a check valve means in said bypass conduit allowing flow only in the direction out of said at least one wheel cylinder, whereby allowing rapid depressurization of said at least one wheel cylinder upon cessation of pressure in said first chamber.

9. The brake pressure control according to claim 1 further including a flow restriction intermediate the second chamber and said at least one wheel cylinder but upstream from the point of connection of said outlet valve to said at least one wheel cylinder.

10. A method of controlling the application of fluid pressure from a source to a brake operating wheel cylinder in an automotive fluid actuated brake system including an automatic control system adapted to automatically vary the pressure in said wheel cylinder, said method including the steps of:

interposing an inlet valve between said source and said wheel cylinder so as to direct all flow to said wheel cylinder to be through said inlet valve;

defining a first and second chamber in a housing of said inlet valve with either side of an element movable in said housing;

placing said first chamber in communication with said source;

placing said second chamber in communication with said wheel cylinder;

subjecting said movable element to fluid pressure from said source while in all positions of said movable element in said housing requiring all flow from said source to said wheel cylinder to pass through a restrictive passage in said element extending from said first chamber to said second chamber;

resisting movement of said movable element by application of a countering force to cause said movable element to shift correspondingly to the magnitude of said pressure to which said movable element is subjected; and, modulating the flow from said second chamber to said wheel cylinder in correspondence to the shifted position of said element.

11. The method according to claim 10 wherein said element is shifted to force an initial filling volume from said second chamber to said wheel cylinder.

12. The method according to claim 11 wherein said element is shifted against a fixed stop after a predetermined extent of travel corresponding to forcing out of said filling volume, only further restricted flow through said element to said wheel cylinder thereafter occurring.

13. The method according to claim 10 further including the step of metering flow from said second chamber by proportionate covering of an aperture by shifting of said element.

14. The method according to claim 13 wherein said metering step occurs upon initial shifting of said element.

15. The method according to claim 11 further including the step of metering flow from said second chamber by proportional covering of an aperture by shifting of said element past the position whereat said filling volume has been forced out.

16. A brake pressure control, especially for use with automotive vehicles, having an automatic brake pressure control system, and operating on a fluid pressure medium, and comprising a master cylinder, at least one wheel cylinder, a pressure modulator for varying the fluid pressure in said at least one wheel cylinder during the brake pressure control mode, with the pressure modulator being provided with at least one inlet valve and at least one outlet valve, each associated with said at least one wheel cylinder, further comprising a source of pressurized fluid for generating a fluid pressure, and an electronic controller, characterized in that the inlet valve comprises a piston and a cylinder said piston axially displaceable in said cylinder, said piston defining in said cylinder a first chamber comprising a master cylinder-pump pressure chamber, in communication with the master cylinder and the source of pressurized fluid, and a second chamber comprising a wheel cylinder pressure chamber, in communication with the wheel cylinder, a spring acting against said piston so that said piston forces pressure fluid from the wheel cylinder pressure chamber into the wheel cylinder against the force of said sprig when advanced by fluid pressure in said master cylinder-pump chamber, and a throttle opening provided in the piston which, through its flow cross-section, establishes a communication between the master cylinder-pump pressure chamber and the wheel cylinder pressure chamber.

17. A brake pressure control according to claim 16 characterized in that the piston, substantially, is in the form of a sleeve having a sleeve bottom exhibiting the end of spring in abutment with the piston, and that the sleeve bottom contains the throttle.

18. A brake pressure control according to claim 16, characterized in that provided between the wheel cylinder pressure chamber and the wheel cylinder, on the one hand, and the line between the master cylinder and the master cylinder pump pressure chamber on the other hand, is a conduit containing a check valve opening toward the master cylinder.

19. A brake pressure control according to claim 16 characterized in that disposed in the conduit between the wheel cylinder pressure chamber, and the wheel cylinder and the outlet valve is an additional flow restriction.

20. A brake pressure control, especially for use with automotive vehicles, having an automatic brake pressure control system and operating on a fluid pressure medium, and comprising a master cylinder, at least one wheel cylinder, a pressure modulator for varying the fluid pressure in the wheel cylinders during the brake pressure control mode, with the pressure modulator containing at least one inlet valve and at least one outlet valve, each associated with said at least one wheel cylinder, further comprising at least one pressure fluid source for generating a fluid pressure, and an electronic control circuit, characterized in that:
said inlet valve comprises a flow-limiting valve including a piston and cylinder, said piston axially displaceable in said cylinder, said piston defining in said cylinder a first chamber comprising a master cylinder-pump pressure chamber in communication with the master cylinder and the pump pressure side, and a second camber comprising a wheel cylinder pressure chamber, a conduit extending from said second chamber in communication with the wheel cylinder, an aperture in said cylinder second chamber communicating with said conduit to said wheel cylinder a spring acting against said piston, said piston moving against said spring to force pressure fluid from the wheel cylinder pressure chamber through said aperture into the wheel cylinder, said piston having a throttle which, through its flow crosssection, establishes a communication between the master cylinder pump pressure chamber and the wheel cylinder pressure chamber the piston in the form of a control slide provided with a control edge and the spring as a control spring, the piston, under the effect of the pressure in the master cylinder pump pressure chamber acting thereon, on the one hand, and under the effect of the force of the spring acting thereon, on the other hand, in the opposite direction, and of the pressure in the wheel cylinder pressure chamber, takes a position of equilibrium in which the control edge sweeps over the aperture to an extent such that a constant nominal flow rate is supplied to the conduit to the wheel cylinder, which nominal flow rate is independent of further pressure increases in the master cylinder pump pressure chamber.

21. A brake pressure control according to claim 20 characterized in that disposed in the conduit between the wheel cylinder pressure chamber, and the wheel cylinder and the outlet valve is an additional flow restriction.

22. A brake pressure control, for use with automotive vehicles, having an automatic brake pressure control system and operating on a pressurized fluid, and comprising a master cylinder, at least one wheel cylinder, a pressure modulator for varying the fluid pressure in said at least one wheel cylinder during the brake pressure control mode, with the pressure modulator containing at least one inlet valve and at least one outlet valve each associated with said at least one wheel cylinder, further comprising at least one pressure fluid source for generating a fluid pressure, and an electronic control circuit, characterized in that the inlet valve is configured as a flow-limiting valve including a piston and cylinder, the piston axially displaceable in said cylinder between a retracted resting position and an advanced position against a stop, said piston separates a first chamber in said cylinder in communication with the master cylinder and the pressure source, said first chamber comprising master cylinder-pump pressure chamber, from a second chamber comprising a wheel cylinder pressure chamber,
said cylinder having an aperture formed in said second chamber, a conduit leading from said aperture placing said second chamber in communication with the wheel cylinder, the piston formed with a throttle passage, connecting through the flow cross-section thereof the master cylinder-pump pressure chamber to the wheel cylinder pressure chamber, the throttle passage defining the sole flow path from said master cylinderpump chamber to said wheel cylinder, the piston configured as a control slide provided with a control edge, and a spring configured as a control spring acting on the spring, the piston assuming a position of equilibrium under the effect of the pressure in the master cylinder-pump pressure chamber acting thereon, in one direction and under the effect of the force of the spring acting thereon in the opposite direction, and under the effect of the pressure in the wheel cylinder pressure chamber also acting thereon in the opposite direction, wherein the control edge has wept over the aperture to adjust the flow rate to the conduit leading to the wheel cylinder to an extent such that a constant nominal flow rate is supplied to the conduit leading to the wheel cylinder, which is independent of further pressure increases in the master cylinder-pump pressure chamber, and that the aperture of the conduit leading to the wheel cylinder is located in the area of the control edge of the piston once the same is in said resting position.

23. A brake pressure control according to claim 22, characterized in that disposed in the conduit between the wheel cylinder pressure chamber, and the wheel cylinder and the outlet valve is an additional flow restriction.

* * * * *